(12) United States Patent
Chernoguz et al.

(10) Patent No.: US 8,355,888 B2
(45) Date of Patent: Jan. 15, 2013

(54) PEDESTRIAN NAVIGATION SYSTEM AND METHOD

(75) Inventors: Nahum Chernoguz, Carmiel (IL); Avraham Kagan, Ramat-Hasharon (IL)

(73) Assignee: Israel Aerospace Industries Ltd., Lod (IL)

( * ) Notice: Subject to any disclaimer, the term of this patent is extended or adjusted under 35 U.S.C. 154(b) by 852 days.

(21) Appl. No.: 12/523,456

(22) PCT Filed: Jan. 21, 2008

(86) PCT No.: PCT/IL2008/000092
§ 371 (c)(1),
(2), (4) Date: Jul. 16, 2009

(87) PCT Pub. No.: WO2008/087651
PCT Pub. Date: Jul. 24, 2008

(65) Prior Publication Data
US 2010/0004860 A1    Jan. 7, 2010

(30) Foreign Application Priority Data
Jan. 21, 2007  (IL) .......................................... 180833

(51) Int. Cl.
*G01C 22/00* (2006.01)
*G01B 7/14* (2006.01)
*G01B 11/14* (2006.01)
*G01B 17/00* (2006.01)
*G01B 21/00* (2006.01)
*G06F 19/00* (2011.01)
*G06F 17/40* (2006.01)

(52) U.S. Cl. ........... 702/160; 73/178 R; 73/490; 377/17; 377/24.2; 702/187; 702/189; 708/200

(58) Field of Classification Search ................ 73/178 R, 73/488, 490, 865.8; 377/1, 17, 19, 24, 24.2; 702/1, 127, 155, 158, 160, 187, 189; 708/100, 708/105, 200
See application file for complete search history.

(56) References Cited

U.S. PATENT DOCUMENTS
143,491 A    10/1873  Bohaker
(Continued)

FOREIGN PATENT DOCUMENTS
EP    0360930 A  *  4/1990

OTHER PUBLICATIONS

Seara et al., "Information Management for Gaze Control in Vision Guided Biped Walking," 2002 IEEE/RSJ Intl. Conference on Intelligent Robots and Systems EPFL, Oct. 2002, pp. 31-36, Lausanne, Switzerland.

(Continued)

*Primary Examiner* — Edward Cosimano
(74) *Attorney, Agent, or Firm* — Oliff & Berridge, PLC

(57) ABSTRACT

An on-foot pedestrian navigation module useful for pedestrian navigation when operated with at least a control unit and another on-foot pedestrian navigation module, comprising (a) at least a first sensor unit and a second sensor unit, wherein each sensor unit including an up/down sensor adapted for sensing an 'up' condition and a 'down' condition associated with relative displacement of the module with respect to a surface, and a signal transmitter/receiver adapted, in response to an activation signal coming from a module controller, for generating a propagating signal (b) a module controller for controlling the operation of the module in response to a control signal coming from the control unit and (c) a communication unit for enabling said module to communicate with said at least the control unit and other module, thereby facilitating collecting motion data at the control unit and integrating the motion data with motion data coming from the other module, the motion data being indicative of a condition of each up/down sensor and receipt of the propagating signal by at least two sensor units of said other module, and wherein the motion data is useful for determining a momentary position of the pedestrian's foot during motion.

40 Claims, 9 Drawing Sheets

U.S. PATENT DOCUMENTS

| | | | |
|---|---|---|---|
| 3,398,268 A * | 8/1968 | Prichodjko et al. | 342/453 |
| 4,371,945 A | 2/1983 | Karr et al. | |
| 4,510,704 A * | 4/1985 | Johnson | 36/136 |
| 4,703,445 A | 10/1987 | Dassler | |
| 4,771,394 A * | 9/1988 | Cavanagh | 702/160 |
| 5,583,776 A | 12/1996 | Levi et al. | |
| 5,640,170 A | 6/1997 | Anderson | |
| 5,744,953 A | 4/1998 | Hansen | |
| 6,132,391 A | 10/2000 | Onari et al. | |
| 6,183,425 B1 * | 2/2001 | Whalen et al. | 600/592 |
| 6,522,266 B1 | 2/2003 | Soehren et al. | |
| 6,549,845 B2 | 4/2003 | Eakle, Jr. et al. | |
| 6,801,855 B1 | 10/2004 | Walters et al. | |
| 6,826,477 B2 | 11/2004 | Ladetto et al. | |
| 6,834,234 B2 | 12/2004 | Scherzinger et al. | |
| 6,876,926 B2 | 4/2005 | Kirkland et al. | |
| 7,671,734 B2 * | 3/2010 | Chu et al. | 340/539.13 |
| 2002/0038178 A1 | 3/2002 | Talkenberg et al. | |
| 2002/0091482 A1 * | 7/2002 | Eakle et al. | 701/207 |
| 2002/0143491 A1 | 10/2002 | Scherzinger | |
| 2003/0080869 A1 | 5/2003 | Pellet et al. | |
| 2008/0204223 A1 * | 8/2008 | Chu et al. | 340/539.13 |
| 2009/0240171 A1 * | 9/2009 | Bamberg et al. | 600/595 |
| 2011/0208444 A1 * | 8/2011 | Solinsky | 702/41 |

OTHER PUBLICATIONS

Shunyuan, "GETA Sandals: Wearable Indoor Self Location Tracking System." (Date Unknown).

Okuda et al., "The GETA Sandals: A Footprint Location Tracking System," LoCA, May 12-13, 2005, pp. 120-131.

Shunyuan et al, "The GETA Sandals: A Footprint Location Tracking System." (Date Unknown).

Shunyuan, "GETA Sandals: Walk Away with Localization." (Date Unknown).

Ladetto, "Digital Magnetic Compass and Gyroscope for Dismounted Soldier Position and Navigation." (Date Unknown).

Foxlin, "Pedestrian Tracking with shoe-mounted inertial sensors," IEEE Computer Graphics and Applications, Nov./Dec. 2005, pp. 38-44, IEEE Computer Society.

Godha, "Integrated GPS/INS System for Pedestrian Navigation in a Signal Degraded Environment," ION GNSS 2006, Sep. 26-29, 2006, pp. 1-14, Fort Worth TX.

Stirling, "An Innovative Shoe-Mounted Pedestrian Navigation System," GNSS 2003, Apr. 22-25, 2003, pp. 1-15, Graz, Austria.

Jirawimut, "A Method for Dead Reckoning Parameter Correction in Pedestrian Navigation System," IEEE Transactions on Instrumentation and Measurement, Feb. 1, 2003, vol. 52, No. 1, IEEE.

Reinecke, "Pedestrian Navigation by measuring the stride length," Memorandum to degree dissertation at the Bremen University, May 29, 2006, pp. 1-10. (with English translation).

International Search Report issued in International Application No. PCT/IL2008/000092 by the International Bureau on Oct. 10, 2008.

* cited by examiner

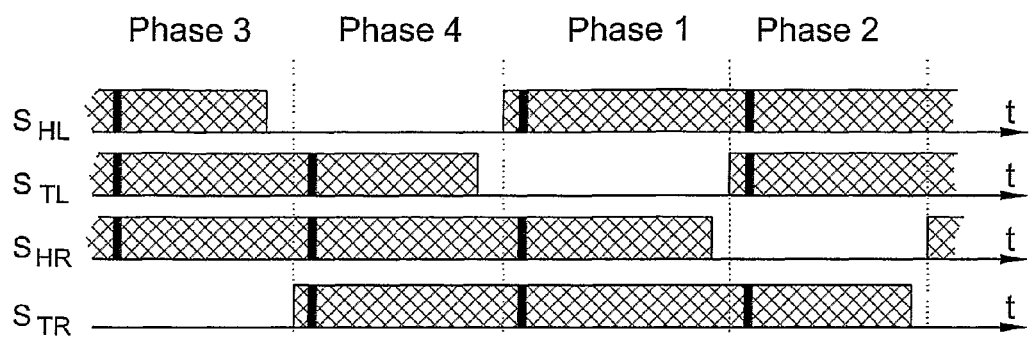
Fig. 5a (Forward short-step walk)
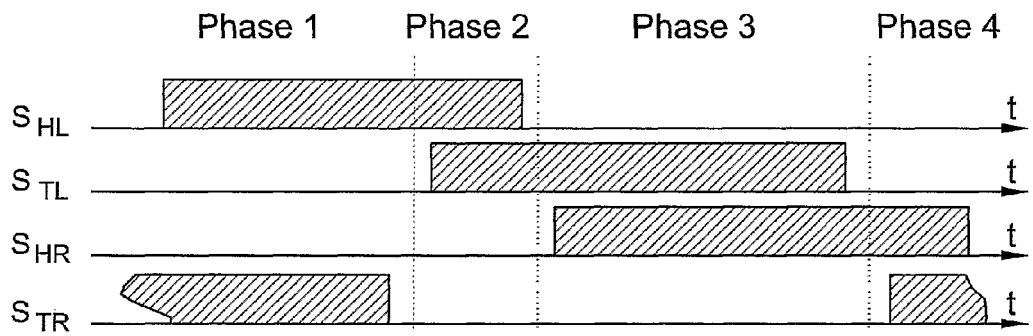
Fig. 5b (Long-step walk)
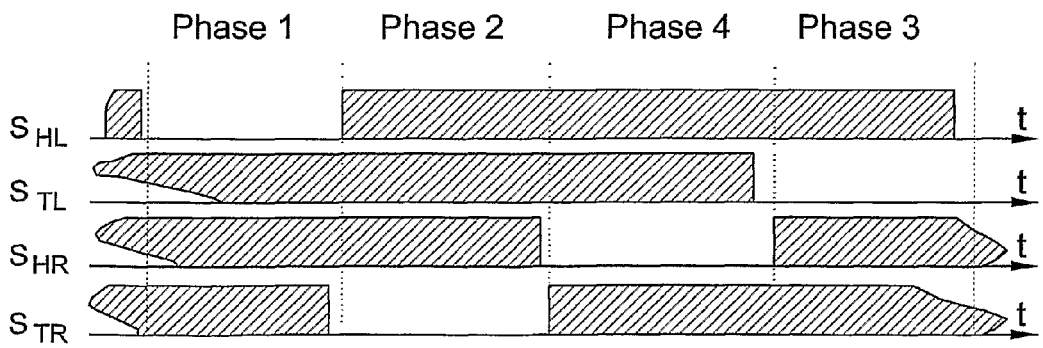
Fig. 5c (Backward stepping)

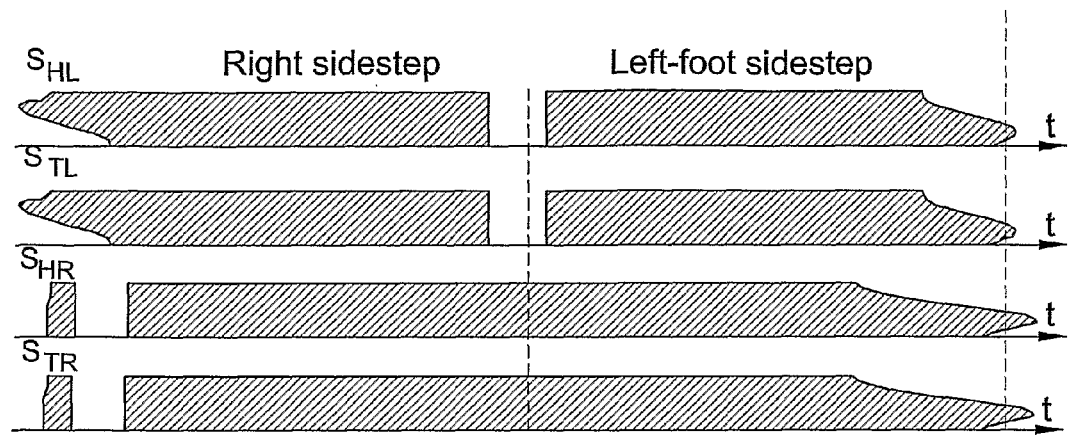
Fig. 5d (Footprint stepping)
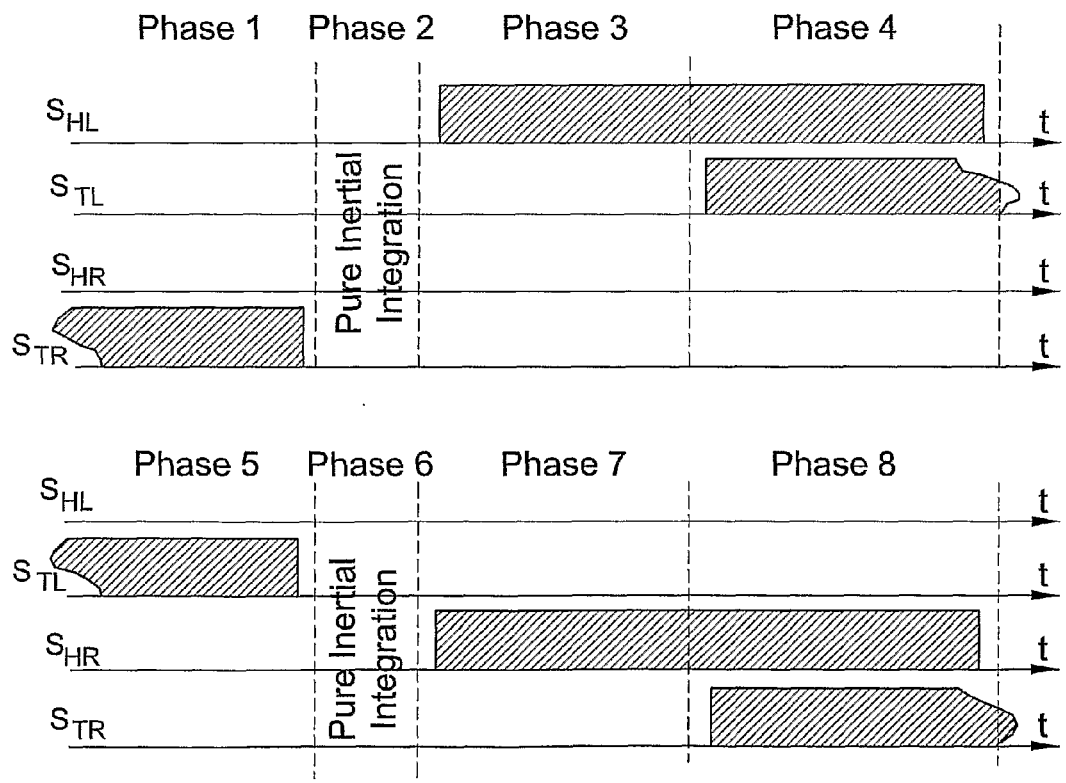
Fig. 5e (Running)

PEDESTRIAN NAVIGATION SYSTEM AND METHOD

FIELD OF THE INVENTION

This invention relates to a pedestrian navigation system and method.

BACKGROUND OF THE INVENTION

Pedestrian tracking and positioning are required for a wide variety of navigation applications, such as search and rescue, military applications, sports and tourism navigation, commercial location-based services, and many more. Several pedestrian navigation aids are known that use low-cost, light-weight devices. There are known hand-held aids, as well as body-mounted aids e.g. devices mounted on head, shoulder, belt, shoe or foot.

There are known pedestrian navigation aids that integrate several sensors and units e.g. Inertial Measurement Unit (IMU, e.g. microelectro-mechanical system (MEMS) including gyroscopes and accelerometers), a pedometer, a magnetometer, Global Positioning System (GPS and like systems), sonar and radar.

An IMU solution typically suffers from errors accumulated due to inertial sensor's drifts: even a small inertial measurement error contributes to high position error, which rapidly grows as a high order polynomial function of time. Thus, pedestrian navigation aids typically include a navigation error corrector, typically implemented as a Kalman filter updating component. Inertial measurements are typically corrected based on local measurements provided by local sensors e.g. the magnetometer, and/or with exterior indications coming from external infrastructure and sources such as a LAN (Local Area Network), radar beacon or GPS. However, a problem arises when such exterior indications or signals are unavailable or not exploitable, e.g. when a GPS signal is blocked or degraded, even occasionally, or when the LAN is unavailable.

The so-called ZUPT (Zero-velocity updates) technique is also used to correct IMU measurements and reduce inertial errors. According to this technique, zero-velocity updates coming from e.g. the inertial sensor are fed into the error corrector that yield a correction input which in turn is provided to a navigation processor and processed with the IMU data. Typically, ZUPT enables correcting parameters such as position, velocity, acceleration, pitch and roll bias, thereby reducing inertial drift errors. Zero-velocity updates are typically provided every time the pedestrian foot (on which the IMU is accommodated) strikes the ground.

The so-called "dead reckoning" (DR or PDR—Pedestrian Dead Reckoning) method is an autonomous method independent of exterior indications, for determining position and other parameters of a pedestrian by calculating the accumulated displacement of the pedestrian from a given starting point. The pedestrian displacement from the known position is calculated based upon some or all of the following measured or calculated parameters: step counting (e.g. using accelerometers), velocity, time, heading (e.g. using gyro signal), and stride length (e.g. using a specific accoustic measuring unit or the known connection (function) between stride length and stride frequency) Typically, PDR position error grows as a function of range rather than of time. PDR parameters are sometimes corrected and calibrated based upon input coming e.g. from a GPS unit.

The following patents and patent applications relate to pedestrian navigation: U.S. Pat. Nos. 4,371,945; 5,583,776; 6,522,266; 6,549,845; 6,826,477, and US Patent Application No. 2002/0143491.

Also relevant to the field of pedestrian navigation are: E. Foxlin, "Pedestrian tracking with shoe-mounted inertial sensors", IEEE Computer Graphics and applications, November/December 2005, IEEE 0272-1716/05; and S. Gudha, G. Lachapelle and M. E. Cannon, "Integrated GPS/INS systems for pedestrian navigation in a signal degraded environment", ION GNSS 2006, Fort Worth, 26-29 Sep. 2006; Q. Ladetto, J. van Seeters, S. Sokolowski, Z. Sagan, B. Merminod, "Digital Magnetic Compass and Gyroscope for Dismounted Soldier Position and Navigation", NATO Research and Technology Agency, Sensors & Electronics Technology Panel; Ross Stirling, Jussi Collin, Ken Fyfe, Gerard Lachapelle, "An Innovative Shoe-Mounted Pedestrian Navigation System", GNSS 2003, Graz, Austria, April 2003; R. Jirawimut, P. Ptasinski, V. Garaj, F. Cecelja, W. Balachandran, "A Method for Dead Reckoning Parameter Correction in Pedestrian Navigation System", IEEE Trans. Instrumentation and Measurement, Vol. 52, No. 1, February 2003, pp. 209-215; K. Okuda. S. Yeh, C. Wu, K. Chang, H. Chu, "The GETA Sandals: A Footprint Location Tracking System", LoCA 2005, Munich, Germany.

GETA sandals provide a navigation system that employs two on-foot modules (wooden sandals) each having two sensor units installed thereon. For example, one module—e.g. left foot sandal—includes two ultrasonic-infrared receivers and the other module—right foot sandal—includes two ultrasonic-infrared transmitters (other sensor configurations are also known). Each time the pedestrian strikes the surface, the transmitters transmit a signal, which is received by the receivers, and signal receipt information is used in performing TOA (Time of Arrival) calculations, thereby facilitating determination of relative displacement vector. GETA sandals and respective navigation methods require substantially full contact of two feet on the surface. However during certain motion types including forward short-step walking, occurrence of such a condition is not always guaranteed. GETA sandals technique provides new position information every second stride. GETA sandals are typically provided with a wooden sole and this typically imposes a burden on the pedestrian.

There is a need in the art for an autonomous pedestrian positioning and navigation device for indoor and outdoor environments which can operate in the occasional or permanent absence of external position indication e.g. GPS or LAN. There is a further need in the art for a navigation device and method suitable for a wide variety of pedestrian motion types. There is a need in the art for an efficient, highly accurate pedestrian navigation device and method. There is a need in the art for a pedestrian navigation device which can provide a high accuracy level with low-class inertial units. There is a need in the art for a compact navigation device.

SUMMARY OF THE INVENTION

In accordance with an embodiment of the invention there is provided an on-foot pedestrian navigation module useful for pedestrian navigation when operated with at least a control unit and another on-foot pedestrian navigation module, the module comprising: at least a first sensor unit and a second sensor unit, wherein each sensor unit including an up/down sensor adapted for sensing an 'up' condition and a 'down' condition associated with relative displacement of the module with respect to a surface, and a signal transmitter/receiver adapted, in response to an activation signal coming from a module controller, for generating a propagating signal; a module controller for controlling the operation of the module in response to a control signal coming from the control unit; a communication unit for enabling said module to communicate with said at least the control unit and other module, thereby facilitating collecting motion data at the control unit and integrating said motion data with motion data coming from said other module, wherein said motion data being indicative of a condition of each up/down sensor and receipt of said acoustic signal by at least two sensor units of said other module, and wherein said motion data is useful for determining a momentary position of the pedestrian's foot during motion.

According to another embodiment of the invention there is provided a sensor arrangement useful for pedestrian navigation, the sensor arrangement comprising a first navigation module and a second navigation module, each navigation module comprising: at least a first sensor unit and a second sensor unit, wherein each sensor unit including an up/down sensor adapted for sensing an 'up' condition and a 'down' condition associated with relative displacement of the module with respect to a surface, and a signal transmitter/receiver adapted, in response to an activation signal coming from a module controller, for generating a propagating signal; a module controller for controlling the operation of the module in response to a control signal coming from the control unit; a communication unit for enabling said module to communicate with said at least the control unit and other module, wherein said control unit is adapted for: receiving from said first module and second module data indicative of a condition of respective up/down sensors; applying on said data a predetermined pedestrian motion model and in response, generating an activating signal for causing a selected acoustic transducer accommodated on the first or second module to generate an acoustic signal; and in case an acoustic transducer accommodated on the first module is activated, receiving from at least the second module data indicative of a receipt of said acoustic signal by at least two other acoustic transducers, and in case an acoustic transducer accommodated on the second module is activated, receiving said data from at least the first module; and repeating said operations (i)-(iii) during a pedestrian motion, thereby enabling TOA (Time of Arrival) processing which is useful in determining momentary positions of the pedestrian during motion.

According to an embodiment of the invention, the predetermined pedestrian motion model is based on modeling of at least one motion type by analyzing respective displacements with respect to the surface of at least three module points each corresponding to a respective acoustic transducer, at least one of said points is not located on the same module as the other points.

According to yet another embodiment of the invention there is provided a pedestrian navigation system comprising a sensor arrangement useful for pedestrian navigation, the sensor arrangement comprising a first navigation module and a second navigation module, each navigation module comprising: at least a first sensor unit and a second sensor unit, wherein each sensor unit including an up/down sensor adapted for sensing an 'up' condition and a 'down' condition associated with relative displacement of the module with respect to a surface, and a signal transmitter/receiver adapted, in response to an activation signal coming from a module controller, for generating a propagating signal; a module controller for controlling the operation of the module in response to a control signal coming from the control unit; a communication unit for enabling said module to communicate with said at least the control unit and other module; wherein said control unit is adapted for: receiving from said first module and second module data indicative of a condition of respective up/down sensors; applying on said data a predetermined pedestrian motion model and in response, generating an activating signal for causing a selected acoustic transducer accommodated on the first or second module to generate an acoustic signal; and in case an acoustic transducer accommodated on the first module is activated, receiving from at least the second module data indicative of a receipt of said acoustic signal by at least two other acoustic transducers, and in case an acoustic transducer accommodated on the second module is activated, receiving said data from at least the first module; and repeating said operations (i)-(iii) during a pedestrian motion; wherein the pedestrian navigation system further comprising a navigation processing unit coupled to or integrated with the control unit, said navigation processing unit being adapted for performing TOA processing and determining at least momentary positions of the pedestrian during motion.

According to yet another embodiment of the invention there is provided a pedestrian navigation system comprising a sensor arrangement useful for pedestrian navigation, the sensor arrangement comprising a first navigation module and a second navigation module, each navigation module comprising: at least a first sensor unit and a second sensor unit, wherein each sensor unit including an up/down sensor adapted for sensing an 'up' condition and a 'down' condition associated with relative displacement of the module with respect to a surface, and a signal transmitter/receiver adapted, in response to an activation signal coming from a module controller, for generating a propagating signal; a module controller for controlling the operation of the module in response to a control signal coming from the control unit; a communication unit for enabling said module to communicate with said at least the control unit and other module; wherein said control unit is adapted for: receiving from said first module and second module data indicative of a condition of respective up/down sensors; applying on said data a predetermined pedestrian motion model and in response, generating an activating signal for causing a selected acoustic transducer accommodated on the first or second module to generate an acoustic signal; and in case an acoustic transducer accommodated on the first module is activated, receiving from at least the second module data indicative of a receipt of said acoustic signal by at least two other acoustic transducers, and in case an acoustic transducer accommodated on the second module is activated, receiving said data from at least the first module; and repeating said operations (i)-(iii) during a pedestrian motion; wherein the pedestrian navigation system further comprising a navigation processing unit coupled to or integrated with the control unit, said navigation processing unit being adapted for performing TOA processing and determining at least momentary positions of the pedestrian during motion; wherein said pedestrian navigation system further comprises an Inertial Measuring Unit (IMU) for providing momentary inertial data and wherein said navigation processing unit is further adapted to use said momentary inertial data in processing a navigation solution relating to the pedestrian's motion.

According to yet another embodiment of the invention there is provided a pedestrian navigation system comprising a sensor arrangement useful for pedestrian navigation, the sensor arrangement comprising a first navigation module and a second navigation module, each navigation module comprising: at least a first sensor unit and a second sensor unit, wherein each sensor unit including an up/down sensor adapted for sensing an 'up' condition and a 'down' condition associated with relative displacement of the module with respect to a surface, and a signal transmitter/receiver adapted, in response to an activation signal coming from a module controller, for generating a propagating signal; a module controller for controlling the operation of the module in response to a control signal coming from the control unit; a communication unit for enabling said module to communicate with said at least the control unit and other module; wherein said control unit is adapted for: receiving from said first module and second module data indicative of a condition of respective up/down sensors; applying on said data a predetermined pedestrian motion model and in response, generating an activating signal for causing a selected acoustic transducer accommodated on the first or second module to generate an acoustic signal; and in case an acoustic transducer accommodated on the first module is activated, receiving from at least the second module data indicative of a receipt of said acoustic signal by at least two other acoustic transducers, and in case an acoustic transducer accommodated on the second module is activated, receiving said data from at least the first module; and repeating said operations (i)-(iii) during a pedestrian motion; wherein the pedestrian navigation system further comprises a navigation processing unit coupled to or integrated with the control unit, said navigation processing unit being adapted for performing TOA processing and determining at least momentary positions of the pedestrian during motion; wherein said pedestrian navigation system further comprises an Inertial Measuring Unit (IMU) for providing momentary inertial data and wherein said navigation processing unit is further adapted to use said momentary inertial data in processing a navigation solution relating to the pedestrian's motion; and wherein said pedestrian navigation system further comprises an inertial error corrector coupled to at least said GPS unit and magnetometer, said inertial error corrector being further coupled to or integrated with said navigation processing unit, said inertial error corrector being adapted for: receiving from the navigation processing unit a navigation signal indicative of momentary position, velocity and acceleration of the pedestrian; receiving zero-velocity updates (ZUPT), GPS data and magnetometer data and in response generating a correction signal applied to said navigation signal and being indicative of a position correction, velocity correction and an acceleration correction, thereby constituting a corrected navigation solution.

According to yet another embodiment of the invention there is provided a pedestrian navigation system comprising a sensor arrangement useful for pedestrian navigation, the sensor arrangement comprising a first navigation module and a second navigation module, each navigation module comprising: at least a first sensor unit and a second sensor unit, wherein each sensor unit including an up/down sensor adapted for sensing an 'up' condition and a 'down' condition associated with relative displacement of the module with respect to a surface, and a signal transmitter/receiver adapted, in response to an activation signal coming from a module controller, for generating a propagating signal; a module controller for controlling the operation of the module in response to a control signal coming from the control unit; a communication unit for enabling said module to communicate with said at least the control unit and other module; wherein said control unit is adapted for: receiving from said first module and second module data indicative of a condition of respective up/down sensors; applying on said data a predetermined pedestrian motion model and in response, generating an activating signal for causing a selected acoustic transducer accommodated on the first or second module to generate an acoustic signal; and in case an acoustic transducer accommodated on the first module is activated, receiving from at least the second module data indicative of a receipt of said acoustic signal by at least two other acoustic transducers, and in case an acoustic transducer accommodated on the second module is activated, receiving said data from at least the first module; and repeating said operations (i)-(iii) during a pedestrian motion; wherein the pedestrian navigation system further comprises a navigation processing unit coupled to or integrated with the control unit, said navigation processing unit being adapted for performing TOA processing and determining at least momentary positions of the pedestrian during motion; wherein said pedestrian navigation system further comprises an Inertial Measuring Unit (IMU) for providing momentary inertial data and wherein said navigation processing unit is further adapted to use said momentary inertial data in processing a navigation solution relating to the pedestrian's motion; and wherein said pedestrian navigation system further comprises an inertial error corrector coupled to at least said GPS unit and magnetometer, said inertial error corrector being further coupled to or integrated with said navigation processing unit, said inertial error corrector being adapted for: receiving from the navigation processing unit a navigation signal indicative of momentary position, velocity and acceleration of the pedestrian; receiving zero-velocity updates (ZUPT), GPS data and magnetometer data and in response generating a correction signal applied to said navigation signal and being indicative of a position correction, velocity correction and an acceleration correction, thereby constituting a corrected navigation solution; and wherein said pedestrian navigation further comprising a ZUPT checker coupled to said error corrector, navigation processing unit and control unit, wherein said ZUPT checker is adapted for checking if a predetermined ZUPT validity condition is met and: if to the affirmative, continuing applying said correction signal to said navigation signal; and if to the alternative, applying a DR signal to said navigation signal until said ZUPT validity condition is met again, thereby reducing accumulation of inertial drift errors and increasing accuracy of said corrected navigation solution.

According to an embodiment of the invention there is provided a navigation method useful for pedestrian navigation, comprising: (a) associating at least three touch points with heel area and toes area of said pedestrian's left foot and right foot; (b) collecting up/down information about a relative displacement of each of said touch points with respect to a surface; (c) based on said up/down information and in accordance with a predetermined pedestrian motion model and a predetermined transmission/receiving scheme, generating a propagating wave at least at one of said touch points; (d) collecting information of receipt of said propagating wave at least by part of said touch point, this information including Time-of-Arrival information, thereby enabling TOA (Time of Arrival) processing which is useful in determining DR (Dead-Reckoning) momentary positions of the pedestrian during motion.

According to an embodiment of the invention, the predetermined transmission/receiving scheme is one of: transmitting said wave from one of said touch point locating on a first foot and receiving said wave at least at two touch points located at a second foot; and transmitting said wave from two of said touch points located on a first foot and receiving said wave at least at one touch point located on a second foot.

According to an embodiment of the invention, the predetermined pedestrian motion model is based on modeling of at least one motion type by analyzing respective displacements with respect to the surface of said touch points.

According to another embodiment of the invention there is provided a navigation method useful for pedestrian navigation, comprising: (a) associating at least three touch points with heel area and toes area of said pedestrian's left foot and right foot; (b) collecting up/down information about a relative displacement of each of said touch points with respect to a surface; (c) based on said up/down information and in accordance with a predetermined pedestrian motion model and a predetermined transmission/receiving scheme, generating a propagating wave at least at one of said touch points; (d) collecting information of receipt of said propagating wave at least by part of said touch point, this information including Time-of-Arrival information; (e) thereby enabling TOA (Time of Arrival) processing which is useful in determining DR (Dead-Reckoning) momentary positions of the pedestrian during motion; (f) based on information regarding said generating and said receipt, performing TOA processing and determining momentary positions of the pedestrian during motion; (g) repeating said operations (a)-(e) as many times as required and determining a navigation solution relating to the pedestrian's motion.

According to another embodiment of the invention there is provided a navigation method useful for pedestrian navigation, comprising: (a) associating at least three touch points with heel area and toes area of said pedestrian's left foot and right foot; (b) collecting up/down information about a relative displacement of each of said touch points with respect to a surface; (c) based on said up/down information and in accordance with a predetermined pedestrian motion model and a predetermined transmission/receiving scheme, generating a propagating wave at least at one of said touch points; (d) collecting information of receipt of said propagating wave at least by part of said touch point, this information including Time-of-Arrival information; (e) thereby enabling TOA (Time of Arrival) processing which is useful in determining DR (Dead-Reckoning) momentary positions of the pedestrian during motion; (f) based on information regarding said generating and said receipt, performing TOA processing and determining momentary DR positions of the pedestrian during motion; (g) based on momentary inertial data, momentary GPS data, momentary magnetometer data and said momentary DR position data, determining a navigation solution; and (h) repeating said operations (a)-(g) as many times as required.

According to another embodiment of the invention there is provided a navigation method useful for pedestrian navigation, comprising: (a) associating at least three touch points with heel area and toes area of said pedestrian's left foot and right foot; (b) collecting up/down information about a relative displacement of each of said touch points with respect to a surface; (c) based on said up/down information and in accordance with a predetermined pedestrian motion model and a predetermined transmission/receiving scheme, generating a propagating wave at least at one of said touch points; (d) collecting information of receipt of said propagating wave at least by part of said touch point, this information including Time-of-Arrival information; (e) thereby enabling TOA (Time of Arrival) processing which is useful in determining DR (Dead-Reckoning) momentary positions of the pedestrian during motion; (f) based on information regarding said generating and said receipt, performing TOA processing and determining momentary DR positions of the pedestrian during motion; (g) based on momentary inertial data, momentary GPS data, momentary magnetometer data and said momentary DR position data, determining a navigation solution; (h) using zero-velocity updates (ZUPT), GPS data and magnetometer data for correcting said navigation solution, thereby constituting a corrected navigation solution; (i) checking if a predetermined ZUPT validity condition is met and if to the affirmative, continuing applying said correction signal to said navigation signal; and if to the alternative, applying a DR signal to said navigation signal until said ZUPT validity condition is met again; and (j) repeating said operations (a)-(i) as many times as required.

According to yet another embodiment of the invention, there is provided a computerized method for reducing accumulation of inertial drift errors associated with an IMU (Inertial measuring Unit) in processing of a pedestrian navigation solution, the method comprising: (i) providing position value, velocity value and attitude value based on measurements carried out at least by said IMU; (ii) providing position correction, velocity correction and attitude correction calculated based on zero-velocity updates (ZUPT); (iii) generating a corrected position value, corrected velocity value and corrected attitude value by correcting said position value, velocity value and attitude value based on said position correction, velocity correction and attitude correction as long as a predetermined ZUPT validity condition is met, and in case said predetermined ZUPT validity condition is not met, correcting said position value, velocity value and attitude value based on at least a DR position correction calculated based on measurements provided by a Dead-Reckoning (DR) unit; (iv) using said corrected position value, corrected velocity value and corrected attitude value for processing said pedestrian navigation solution, and (v) repeating operations (i)-(iv) as many times as required.

In accordance with an embodiment of the invention there is provided a sensor arrangement useful for pedestrian navigation, the sensor arrangement comprising a first module and a second module and a control unit, wherein each module comprises:
at least a first sensor unit and a second sensor unit, wherein each sensor unit including an up/down sensor adapted for sensing an 'up' condition and a 'down' condition associated with relative displacement of the module with respect to a surface, and an acoustic transducer adapted, in response to an activation signal coming from a module controller, for generating an acoustic signal;
a module controller for controlling the operation of the module in response to a control signal coming from the control unit;
a communication unit for enabling said module to communicate with said at least the control unit and other module,
wherein said control unit is adapted for:
(i) receiving from said first module and second module data indicative of a condition of respective up/down sensors;
(ii) applying on said data a predetermined pedestrian motion model and in response, generating an activating signal for causing a selected acoustic transducer accommodated on the first or second module to generate an acoustic signal; and
(iii) in case an acoustic transducer accommodated on the first module is activated, receiving from at least the second module data indicative of a receipt of said acoustic signal by at least two other acoustic transducers, and in case an acoustic transducer accommodated on the second module is activated, receiving said data from at least the first module; and
(iv) repeating said operations (i)-(iii) during a pedestrian motion,
thereby enabling TOA (Time of Arrival) processing which is useful in determining momentary positions of the pedestrian during motion.

In accordance with an aspect of the invention, there is provided a pedometer system comprising at least first, second and third sensors adapted for attaching to respective soles of a user's footwear such that, in use, the first sensor is located under a toe portion of a first foot and the second and third sensors are respectively located under toe and heel portions of a second foot, whereby, when the user is walking, the three sensors provide an indication when both feet are touching the ground and one foot is substantially flat on the ground.

In accordance with a similar aspect of the invention there is provided a method for detecting that a person is walking, the method comprising:

at least first, second and third sensors adapted for attaching to respective soles of a user's footwear such that, in use, the first sensor is located under a toe portion of a first foot and the second and third sensors are respectively located under toe and heel portions of a second foot;

whereby, when the user is walking, the three sensors provide an indication when both feet are touching the ground and one foot is substantially flat on the ground.

Thus, in its broadest aspect, the invention allows discrimination between a user who walks and one who runs, since walking is characterized by alternate feet contacting the ground at two points, unlike running, where only one point of each foot contacts the ground at each stride.

BRIEF DESCRIPTION OF THE DRAWINGS

In order to understand the invention and to see how it may be carried out in practice, certain embodiments will now be described, by way of non-limiting example only, with reference to the accompanying drawings, in which:

FIGS. 5a-5e are illustrations of a performance over time of a sensor arrangement according to an embodiment of the invention;

DETAILED DESCRIPTION OF EXEMPLARY EMBODIMENTS

Figure 1A:
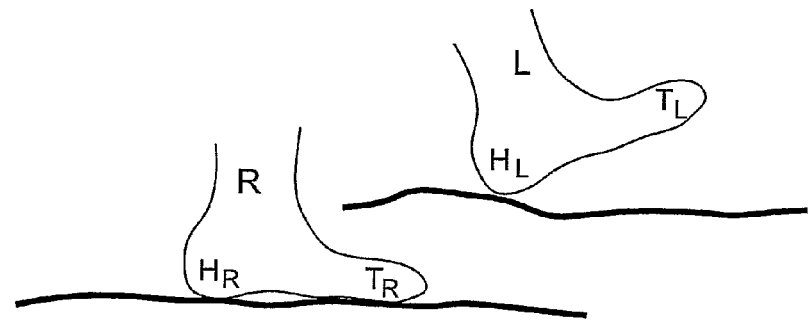
FIGS. 1a-1d are illustrations of a four-phase pedestrian motion model.
Figure 1B:
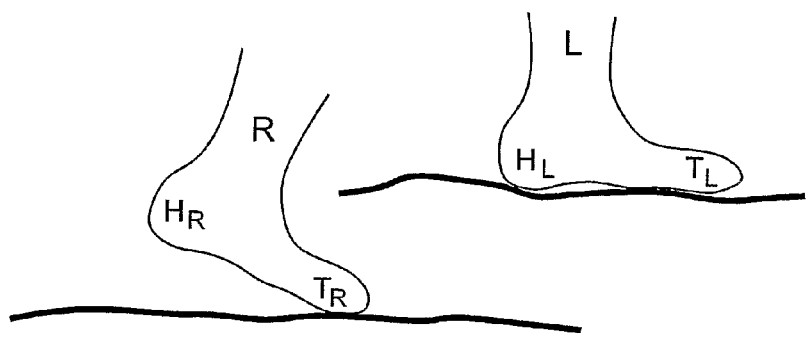
Figure 1C:
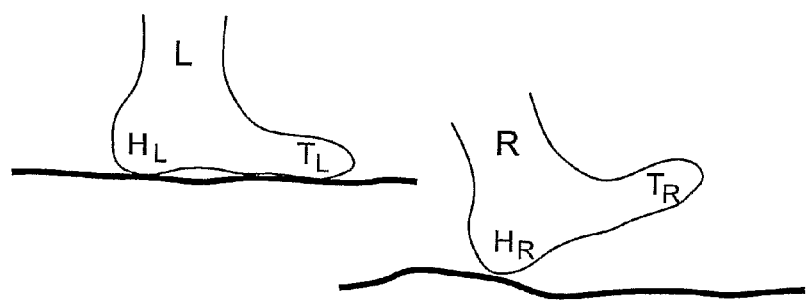
Figure 1D:
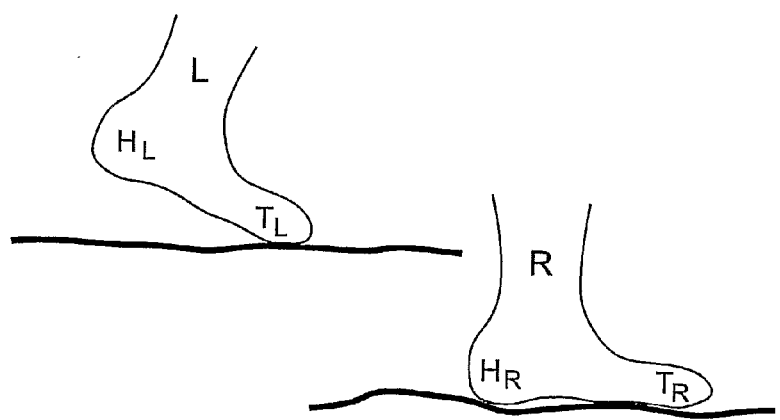

In accordance with a first aspect of the present invention there is provided a substantially autonomous on-foot dead-reckoning system and method utilizing, inter-alia, a sensor unit that comprises at least three or four sensors disposed on different locations on feet of a pedestrian, e.g. two sensors on the right foot and one or two sensors on the left foot. The sensors allow assessing the relative displacement of one foot with respect to the other. The resultant relative displacement data is considered and used in generating and transmitting a propagating signal (e.g. acoustic, infra-red, RF or other electromagnetic signal) from a transmitter/receiver associated with one sensor toward at least two a transmitter/receivers associated with other sensors, respectively. TOA information regarding receipt of the propagating signal by the at least two other transmitter/receivers is used in dead-reckoning navigation processing.

Thus, according to an embodiment of the invention there is provided a sensor unit that facilitates dead-reckoning pedestrian navigation. According to another embodiment of the invention, there is provided a dead-reckoning pedestrian navigation method that employs measurements taken by left and right navigation modules, each comprising at least two sensor units, together having at least three or four sensors disposed on different locations on a left or right foot of a pedestrian. Each sensor is associated with a transmitter/receiver. According to certain embodiments of the invention, at least one of said at least three or four sensors disposed on different locations on a left or right foot of a pedestrian, is integrated with or attached to an IMU (Inertial Measurement Unit).

According to a second aspect of the invention, there is provided a pedestrian navigation device which includes, inter-alia, two navigation modules each comprising, inter-alia, at least two sensor units, an Inertial Measuring Unit (IMU) and an error corrector. According to an embodiment of the invention, information generated based on input provided by the navigation module/s is used by the error corrector for correcting navigation information generated based on IMU measurements. According to an embodiment of the invention, navigation module/s inputs are used for indicating zero-velocity situations.

In accordance with a third aspect of the present invention there is provided a pedestrian navigation device which includes, inter-alia, two navigation modules, an on-foot Inertial Measuring Unit (IMU), a navigation processor, an error corrector and a ZUPT checker. According to an embodiment of the invention, navigation processing is performed by the navigation processor based on IMU inputs. ZUPT inputs are provided to the error corrector from e.g. the IMU, and a resultant correction input is fed to the navigation processor. Navigation module/s inputs are used by the navigation processor for parallel navigation processing. When no zero-velocity updates are available (this is checked by the ZUPT checker), for example in a case of IMU malfunction, a PDR navigation solution is provided as an alternative to the IMU solution. According to certain embodiments of the invention, at least one IMU is used, being attached to or integrated with a navigation module.

In the following, the concept of the invention will be described mainly with respect to the use of acoustic signals for facilitating TOA processing. It should be understood that the invention is not limited by the type of propagating wave and other types can be used with the appropriate modifications and alterations without departing from the scope of the invention including, but lot limited by, infrared signal, RF signal and other electromagnetic signals.

Four-Phase Motion Model

Before turning to the description of certain aspects and embodiments of the present invention, a reference is now made to FIGS. 1a-1d, which illustrate a model of four key phases of a pedestrian motion. This model will be used to present the concepts of the present invention. It should be understood that the invention is not limited by the illustrated model, and other walking and running models may be used without departing from the scope of the invention. According to the model illustrated in FIGS. 1a-1d, forward short-step walking is divided into four sequential phases. The key phases are described hereinafter with reference to four points, two on the right foot and two on the left foot: a left point $T_L$ and right point $T_R$—underneath the toes area (sole) of the left and right feet, respectively; and a left point $H_L$ and a right point $H_R$—underneath the heel area. Each phase is characterized by three of those points touching the ground while the fourth one is lifted off, as illustrated in FIGS. 1a-1d:

Phase I (FIG. 1a): After the left foot was lifted off and sent towards the preferred walking direction and while the right foot stays on the ground, the left heel touches the ground.

Phase II (FIG. 1b): Subsequently, the toes of the left foot touch the ground, and the right heel is lifted off the ground.

Phase III (FIG. 1c): After the right foot was lifted off and sent towards the preferred walking direction and while the left foot stays on the ground, the left heel touches the ground.

Phase IV (FIG. 1d): the right toes return to the ground and the left heel is lifted off.

Not shown in FIGS. 1a-1d are the instances in which only two touch points exist: between phase II and phase III—the right foot is lifted off the ground; between phase IV and phase I of the next stride—the left foot is lifted off the ground. The above-detailed model focuses on the sequential change in the relative position of the heel and toes points.

Four-Sensor Arrangement

Figure 2A:
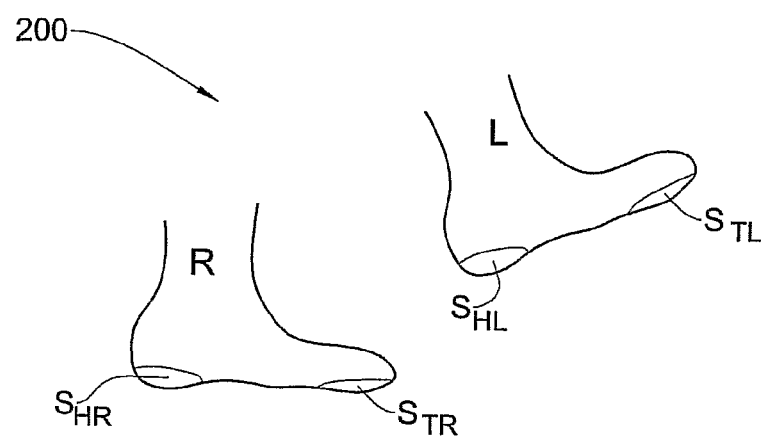
FIGS. 2a-2b are high-level illustrations of a sensor arrangement according to an embodiment of the invention.

FIG. 2a is a high-level illustration of a sensor arrangement 200 according to an embodiment of the invention. Sensor arrangement 200 comprises at least four sensor units, $S_{HL}$, $S_{TL}$, $S_{HR}$, $S_{TR}$, placed substantially underneath at the heel area and toes area of the left and right feet (e.g. shoe soles), respectively (a three-sensor configuration is also appropriate, as will be discussed further below). The sensors are designed to sense a condition of the respective heel or toe, e.g. being on the ground or lifted off. As will be detailed below, integration of indications gathered from three or four sensors at substantially the same time will indicate the momentary stride phase.

According to one embodiment of the invention, each or some of the $S_{HL}$, $S_{TL}$, $S_{HR}$, $S_{TR}$ sensors is a pressure switch, i.e. an on-off switch activated whenever the corresponding toe or heel area is pressed against e.g. the ground. According to another embodiment of the invention, each or some of the sensors are accelerometers.

According to an embodiment of the invention, each of the sensors $S_{HL}$, $S_{TL}$, $S_{HR}$, $S_{TR}$, optionally with additional components (which are not shown in FIG. 2a), are add-on units and are attached to the pedestrian feet (shoes) on demand. According to another embodiment, the sensors $S_{HL}$, $S_{TL}$, $S_{HR}$, $S_{TR}$ and optionally additional components, are provided as part of the shoes.

Figure 2B:
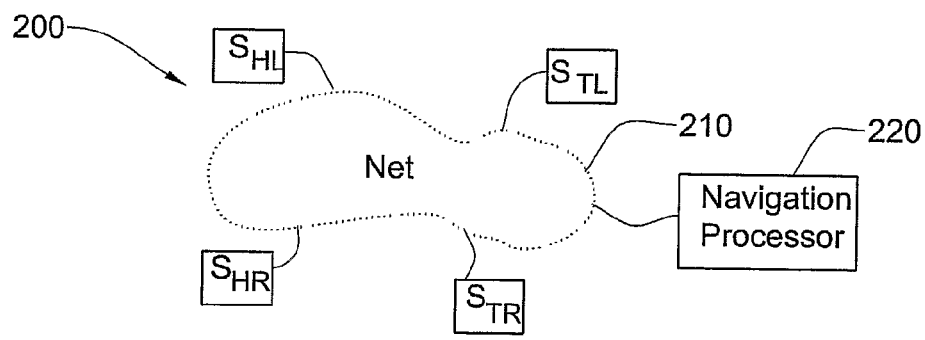

According to certain embodiments of the invention illustrated in FIG. 2b, the $S_{HL}$, $S_{TL}$, $S_{HR}$, $S_{TR}$ share a communication network 210, e.g. wire or wireless LAN (Local area Network) with a navigation processing unit (Processor) 220. Navigation processing unit 220 receives the data gathered by the sensors $S_{HL}$, $S_{TL}$, $S_{HR}$, $S_{TR}$ via the network 210 and uses this data for dead-reckoning pedestrian navigation processing, in the following manner: each of the sensors $S_{HL}$, $S_{TL}$, $S_{HR}$, $S_{TR}$ is further equipped (or associated) with an acoustic transponder, activated in response to an activation signal coming from the navigation processing unit. The signal is transmitted from a transmitting transducer in the form of a burst, and is received by the other transducers. As will be detailed further below, information regarding differences in time of arrival of the signal to the different transducers allows calculating the relative displacements of the sensors in every stride, and hence the position of each sensor at the end of each stride phase.

The principles of dead-reckoning pedestrian navigation processing which is facilitated by the sensor arrangement of the present invention (e.g. the one illustrated in FIG. 2a) will now be detailed with reference to FIGS. 3a-3d and 4a-4b.

In applying the four-phase model illustrated in FIGS. 1a-1d to e.g. flat-surface walking, each phase may be identified by a different configuration of three points touching the surface (three sensors indicating "down") and one point—above the surface. This is illustrated in a self-explanatory manner in FIGS. 3a-3d and summarized in Table (1):

| (1) | | | | |
|---|---|---|---|---|
| Stride Phase | Point $H_L$ Sensor $S_{HL}$ | Point $T_L$ Sensor $S_{TL}$ | Point $H_R$ Sensor $S_{HR}$ | Point $T_R$ Sensor $S_{TR}$ |
| Phase I | down | up | down | down |
| Phase II | down | down | up | down |
| Phase III | down | down | down | up |
| Phase IV | up | down | down | down |

At each phase, three points touch the surface (these points are denoted hereinafter as 'touch points'). Two of the touch points are at the same position as at the previous phase (e.g. at phase II—points $T_R$ and $H_L$); One touch point (denoted hereinafter as 'the new touch point' or 'down-new') touches the surface at an unknown position (e.g. at phase II—point $T_L$); and the fourth point is lift off the surface (e.g. at phase II—point $H_R$). According to an embodiment of the invention, at each motion phase, the unknown position of the third, new touch point is calculated based on the known positions of the other touch points, based on TOA (Time of Arrival) calculations relating to the transmission and receipt of acoustic signals between at least the three touch points.

Figure 3A:
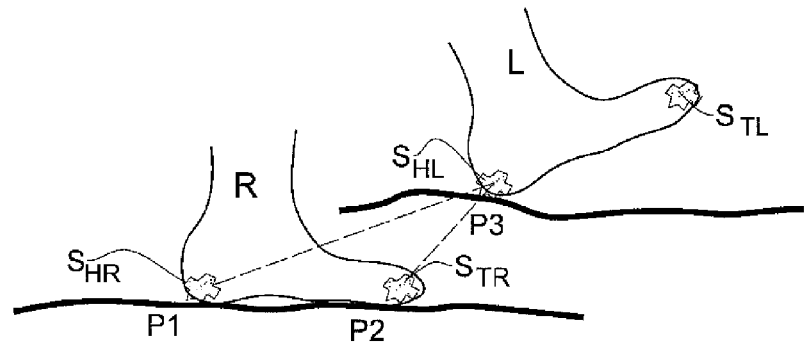
FIGS. 3a-3d are further illustrations of a sensor arrangement according to an embodiment of the invention.
Figure 3B:
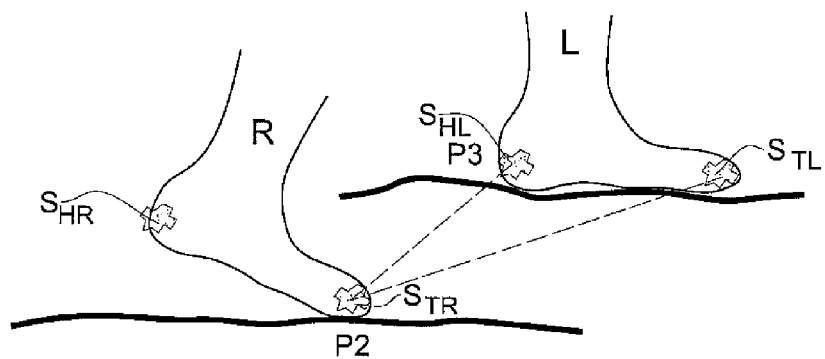
Figure 3C:
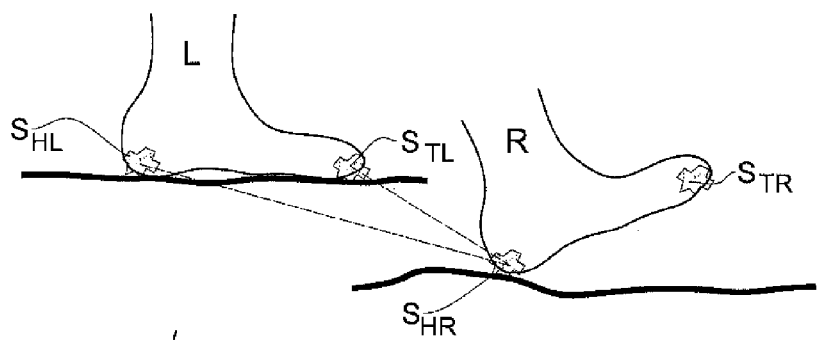
Figure 3D:
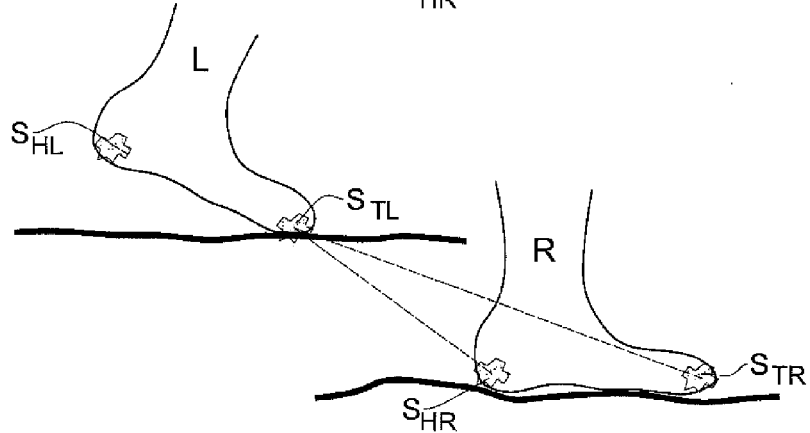

For example, as illustrated in FIG. 3a, the touch points are points P1, P2 and P3. The positions of points P1, P2 were determined at the previous phase (phase IV of the previous stride) and are therefore used as reference points in the current phase to extract the position of the third touch point P3. Points P1 and P2 reside on the same foot, thus the distance between them is known (e.g. measured in advance) and is substantially constant during walking and specifically while both points touch the surface.

Figure 4A:
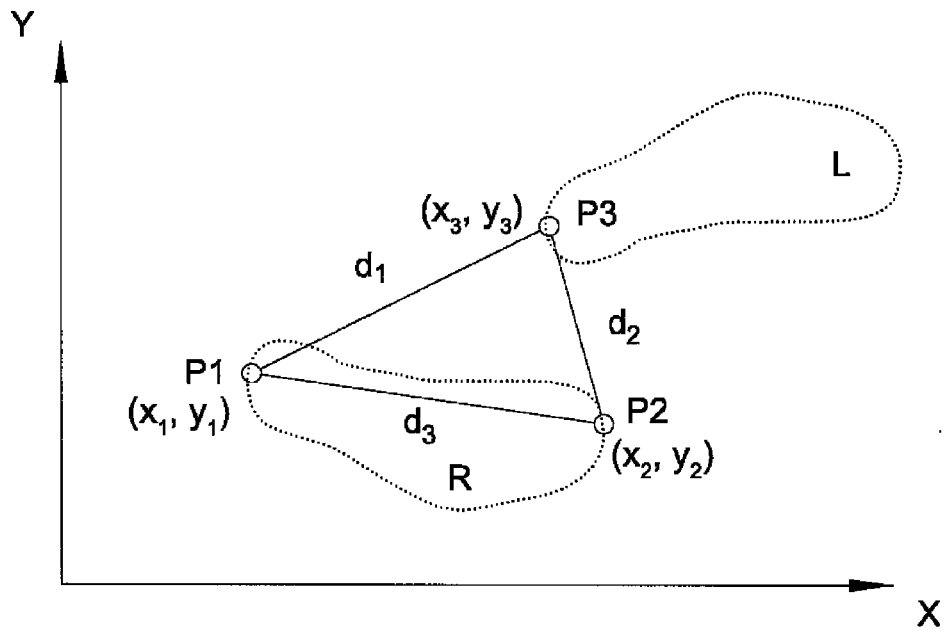
FIGS. 4a-4b are geometric representations of a pedestrian motion phase.

FIG. 4a is a geometric representation of motion phase I illustrated in FIG. 3a: $(x_1, y_1)$ and $(x_2, y_2)$—indicative of the position of the first touch points (assuming $z_1, z_2=0$)—which are known. The distance $d_3$ (the distance between P1 and P2) is also known. The distances $d_1$ and $d_2$ (where $d_1$ is the distances between P3 and P1 and $d_2$ is the distance between P3 and P2) are determined based on TOA calculations using e.g. known TOA techniques, and therefore coordinates $(x_3, y_3)$ indicative of the position of the third touch point are a solution of the following set of equations (1):

$$d_1^2 = (x_3 - x_1)^2 + (y_3 - y_1)^2$$

$$d_2^2 = (x_3 - x_2)^2 + (y_3 - y_2)^2. \quad (1)$$

Figure 4B:
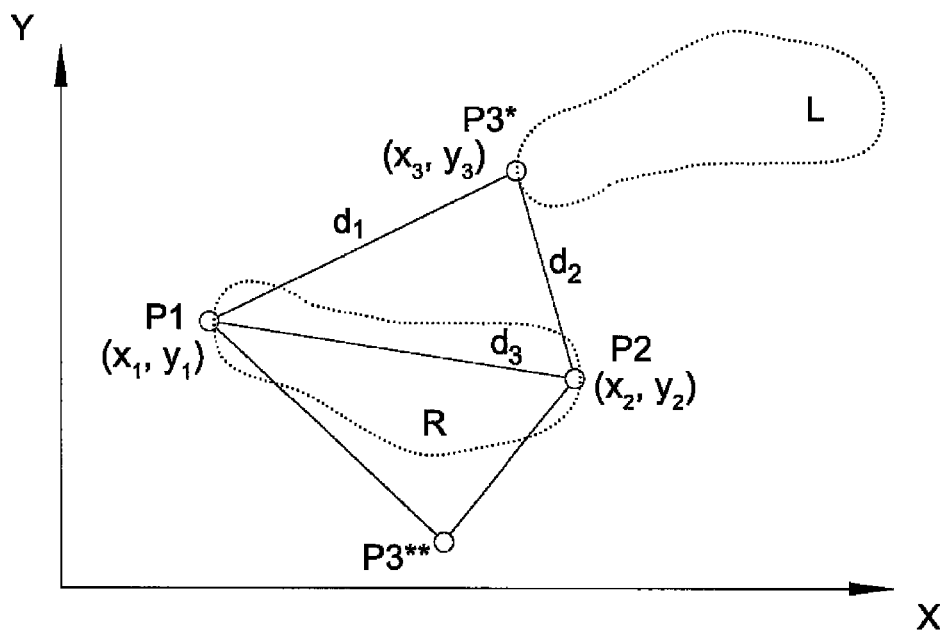

FIG. 4b is a geometric representation of the two possible solutions P3* and P3** of set of equations (1), under the assumption that $z_1$, $z_2$ and $z_3$ equal to zero (motion on a flat surface). In order to select the appropriate solution (point P3*) and eliminate the other one (P3**), additional information is considered, e.g. the expected position of P3* as a left foot point (e.g. based on an assumption that the left foot is much more likely to be landing on the ground to the left of the right foot during a regular stride) or the expected position of P3* based on the position of the same point at the previous stride. It should be understood that the invention is not limited by the manner by which the above-mentioned appropriate solution between possible solutions of equations (1) is selected. At the next phases (e.g. phase II illustrated in FIG. 3b), basically the same geometrical considerations apply. At phases II and IV, when one foot stays on the ground, one distance parameter is already available (e.g. $d_2$ illustrated in FIG. 4a).

In applying the above concept according to an embodiment of the invention, there is provided symmetry between the left module and the right module: TOA calculations are carried out during the walk regarding three touch points (sensors), irrespective of the identity of the points (left foot or right foot). This is facilitated by the use of a transponder which is capable of transmitting a signal as well as receipt of a signal. The concept of the present invention could also be facilitated by using an asymmetrical arrangement, e.g. where only left module is adapted to transmit signals and only right module is adapted to receive signals. In such a case, TOA processing relates to every second stride. The control scheme in such an embodiment is much simpler, compared to the control scheme needed for the symmetrical arrangement discussed above (the control scheme will be presented further below). The asymmetrical arrangement suits certain operational needs, however, for other operational requirements, according to symmetrical embodiments of the invention, the use of measurements taken during every stride increases the accuracy of navigation processing results. Furthermore, hardware redundancy is sometimes advantageous by itself.

According to an embodiment of the invention, TOA calculations required for distance determination (e.g. $d_1$ and $d_2$ illustrated in FIG. 4a) are facilitated as follows. In response to left toes sensor $S_{TL}$ changing its condition from 'down' (as in phase IV of the previous stride) to 'up'—indicating motion phase I—the acoustic transponder associated with left heel sensor $S_{HL}$ is activated and transmits an acoustic signal ('phase I signal'). According to an embodiment of the invention, the signal is generated and transmitted in the form of a burst. The acoustic transponders associated with right sensors $S_{HR}$ and $S_{TR}$ receive the phase I signal at different times of arrival. As is well known in the field of TOA processing, the difference in time of arrival (and in phase of arrival) is indicative of the difference in travel distance of the signal, and can be used for the determination of the distance of travel.

Thus, in accordance with certain embodiments of the present invention, the acoustic transponders associated with the module sensors transmit and receive signals under a predefined transmit-receive scheme. The invention is not limited by the above-mentioned transmit-receive scheme, and many other schemes are possible within the scope of the present invention. An additional non-limiting example is having transponders associated with two 'down' sensors transmitting the acoustic signal substantially in parallel, and the transponder of the third 'down' sensor receiving the propagating signal from the two transmitters.

Determination of Motion Parameters

Pedestrians can perform many types of motions, such as: forward stepping (the so-called forward short-step walk); long-step walking; backward stepping; footprint walking and sidestepping; standing; running; turning; upstairs walking; downstairs walking; one foot and two feet upward jumping; forward stepping along a narrow path; elevated and accelerated motion, and more. Pedestrian motion is complex, comprising many altering types. Thus, according to an embodiment of the invention, there is a need to identify the momentary type of motion in order to activate transmission of acoustic signals by an appropriate sensor at an appropriate time. For example, with respect to the embodiment illustrated e.g. in FIGS. 3a and 4a, sensor $S_{HL}$ needs to be activated during phase I in order to generate the acoustic signal, the receipt of which by sensors $S_{HR}$ and $S_{TR}$ will be used for positioning of sensor $S_{HL}$.

According to an embodiment of the invention, identification of momentary motion type is performed by analyzing the relative condition and the performance of the sensors over time. According to certain embodiments of the invention, information regarding the identity of the 'down-new' sensor (the sensor momentarily changing its condition from 'up' to 'down') is also considered in identification of motion type. This is illustrated in FIGS. 5a-5e in a non-limiting manner, with respect to a sensor arrangement according to the embodiment of the invention described with reference to FIGS. 1a-1d; 2a-2b, 3a-3d and 4a-4b, and certain pedestrian motion models: FIG. 5a relates to forward short-step walk; FIG. 5b relates to long step walk; FIG. 5c relates to backward stepping; FIG. 5d relates to footprint stepping; and FIG. 5e relates to running. It should be understood that the invention is not limited by the exemplary motion models illustrated in FIGS. 5a-5e.

As can be seen, each motion type has its own walking model and this model can be characterized by the mutual performance of the sensors. Thus, according to an embodiment of the invention, the performance of the sensors is monitored over time. Performance data is gathered and used for assessing which motion model from a plurality of motion models best fits to the gathered performance data. Identifying a motion model includes selecting the type of model as well as determining the various phases of the selected model. Also determined in accordance with the selected model are the momentary time boundaries of the respective model phases.

Six-Sensor Arrangement and Other Arrangements

Figure 6:
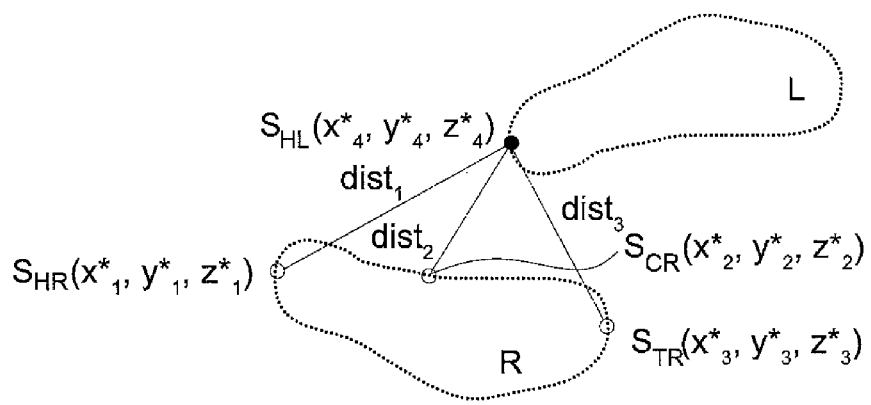
FIG. 6 is another geometric representation of a pedestrian motion phase.

The invention is not limited by the number of sensors which are used, and specifically not by the four-sensor arrangement discussed above. Additional sensors can provide additional information which may be used e.g. to solve navigation positioning in three dimensions (motion on a non-flat surface), provide backup in case of hardware malfunction, overcome measurement errors, and more. Thus, according to an embodiment of the invention, a six-sensor arrangement is provided. FIG. 6 illustrates a geometrical representation of a motion phase I and the geometric problem associated with a six-sensor arrangement. One left-foot sensor $S_{HL}$ and three right-foot sensors $S_{HR}$, $S_{CR}$, $S_{TR}$ are shown (the two other left-foot sensors are not shown in FIG. 6). Sensor $S_{HL}$ is 'down-new' and position parameters $(x^*_4, y^*_4, z^*_4)$ are unknown. In response to identification of the momentary motion type and motion phase (e.g. as described above with reference to FIGS. 5a-5b), sensor $S_{HL}$ is activated for generating and transmitting an acoustic signal. The receipt of this signal by sensors $S_{HR}$, $S_{CR}$, $S_{TR}$ allows performing TOA processing and thus the following equations (2) may be solved in order to determine the new and unknown position of sensor $S_{HL}$:

$$\text{dist}_1^2 = (x^*_4 - x^*_1)^2 + (y^*_4 - y^*_1)^2 + (z^*_4 - Z^*_1)^2$$

$$\text{dist}_2^2 = (x^*_4 - x^*_2)^2 + (y^*_4 - y^*_2)^2 + (z^*_4 - Z^*_2)^2$$

$$\text{dist}_3^2 = (x^*_3 - x^*_1)^2 + (y^*_3 - y^*_1)^2 + (z^*_3 - Z^*_1)^2. \qquad (2)$$

As described above with reference to FIGS. 2a-2b to 6, according to one of its aspects the present invention facilitates autonomous dead-reckoning navigation. The present invention allows for determination of various parameters relating to pedestrian motion, for example: step counting, e.g. counting of phase pairs I+II, III+IV; stride length determination, e.g. distance between toes sensor of one foot and the heel sensor of the other foot; heading (direction of motion), e.g. by comparing and assessing sensors' positions gathered and calculated at a certain phase with those gathered and calculated at previous strides; and type of motion.

Some non-limiting examples of point locations are: a heel point located substantially beneath a heel area and a toes point, located substantially beneath a toe area, constituting a plurality of four points (this is illustrated in FIGS. 3a-3d, 4a-4b); a heel point located substantially beneath a heel area, a toes point located substantially beneath a toe area, and a third point at another areas constituting a plurality of six points; and a heel point located substantially beneath a heel area, a toes point located substantially beneath a toe area, a third point and a fourth point, constituting a plurality of eight points. The third and fourth points may be placed on the same plane as the heel point and the toes point, or be located above this plane.

It should be understood that the invention is not limited by the physical arrangement of the sensors facilitating the points defining the three touch points. Many configurations are possible within the scope of the invention, in order to sense an 'up' or 'down' condition of the heel area and toes area of the feet. The sensors may be located at any suitable location on the foot, as long as they can sense the strike of a respective foot area on the surface and indicate the condition of that area with respect to the surface. Non-limiting examples of locations of sensors on a module are: at the side of the foot near the heel or near the toes; at the upper side of the toes; embedded in the sole, beneath the heel and beneath the toes; near the ankle joint; near the heel bone.

Autonomous Dead-Reckoning Navigation System

Figure 7:
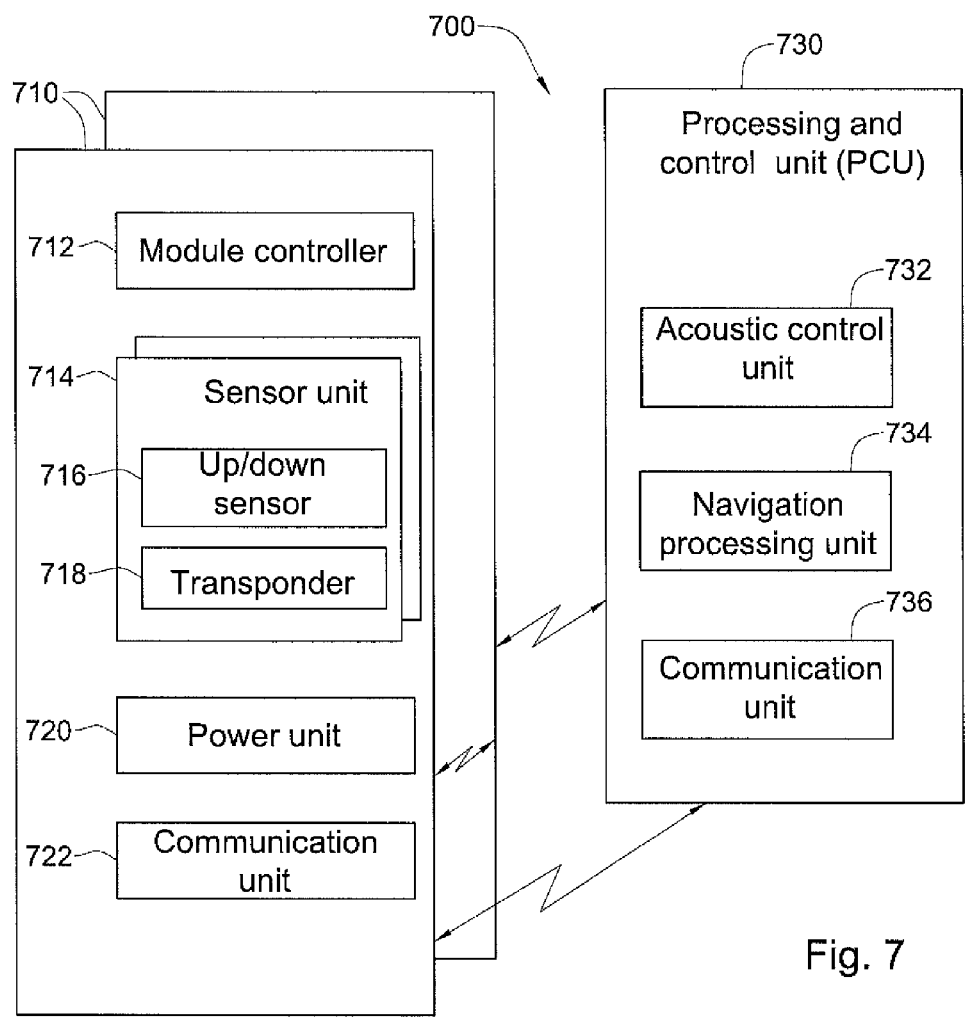
FIG. 7 is a block diagram of a navigation device according to an embodiment of the invention.

FIG. 7 is a block diagram of an autonomous dead-reckoning navigation system 700 according to an embodiment of the invention. Navigation system 700 includes, inter-alia, at least two navigation modules 710, and a processing and control unit 730. Control unit 730 is illustrated as a separate hardware component, which can be implemented as a hand-held unit, shoe mounted unit, etc. However the invention is not limited to the exemplified configuration and other configurations are possible, including, but not limited to, integration of the control unit in one of the navigation modules.

According to an embodiment of the invention, each navigation module 710 comprises, inter-alia, a module controller 712; at least two sensor units 714 (heel sensor, toes sensor and optionally additional sensors); an acoustic transducer 718; power unit 720 (e.g. a battery or a local unit coupled to an external power source) and a communication unit 722. According to certain embodiments of the invention, communication unit 722 includes an antenna.

The modules 710 are communicatively coupled with each other and with the common control unit 730. Processing and control unit 730 comprises, inter-alia, acoustic control unit 732 for activating the generation of acoustic signal by a selected transducer; a navigation processing unit 734 adapted for receiving information about the up/down sensors 716 and based on said information, determining the selected transducer; and a communication unit 736 for facilitating wire or wireless communication between the control unit 730 and modules 710 and optionally other units not shown in FIG. 7.

The sensor units 714 are communicatively coupled to each other via acoustic signaling. Generation and transmission of acoustic signals are controlled by the control unit 730 according to a predefined control scheme (e.g. as described with reference to FIGS. 4a-4b, 5a-5e). The acoustic signal is generated in the form of bursts, and practically no interference between signals generated by the different transducers occurs during many motion types and characteristics.

According to an embodiment of the invention, in response to receipt of an acoustic signal by the transducer 718, the module controller generates a data update that includes at least indication of the acoustic signal receipt and time of arrival. A signal indicative of this data update is sent out and used by a navigation processor for determining the position of the sensors and hence the position displacement of the pedestrian. According to the embodiment of the invention illustrated in FIG. 7, the same navigation processor (element 734) is configured for selecting the transducer (one of transducers 718) appropriate for a certain motion type and phase, as well as for determining of the navigation solution of the momentary phase. According to other embodiments of the invention, the above-mentioned processing tasks are allocated e.g. to a first processing unit responsible for controlling acoustic generation, and a second processing unit, sharing the same communication network and responsible for determining navigation solutions.

The systems and methods of the present invention provide an accurate position determination, as they enable position determination in response to every strike of a foot on a surface (typically every 0.5 second). In turn this allows for using a low-class (and low-cost) inertial unit compared to prior art solutions, substantially without accuracy loss.

Integrated Navigation Systems and Methods

Figure 8:
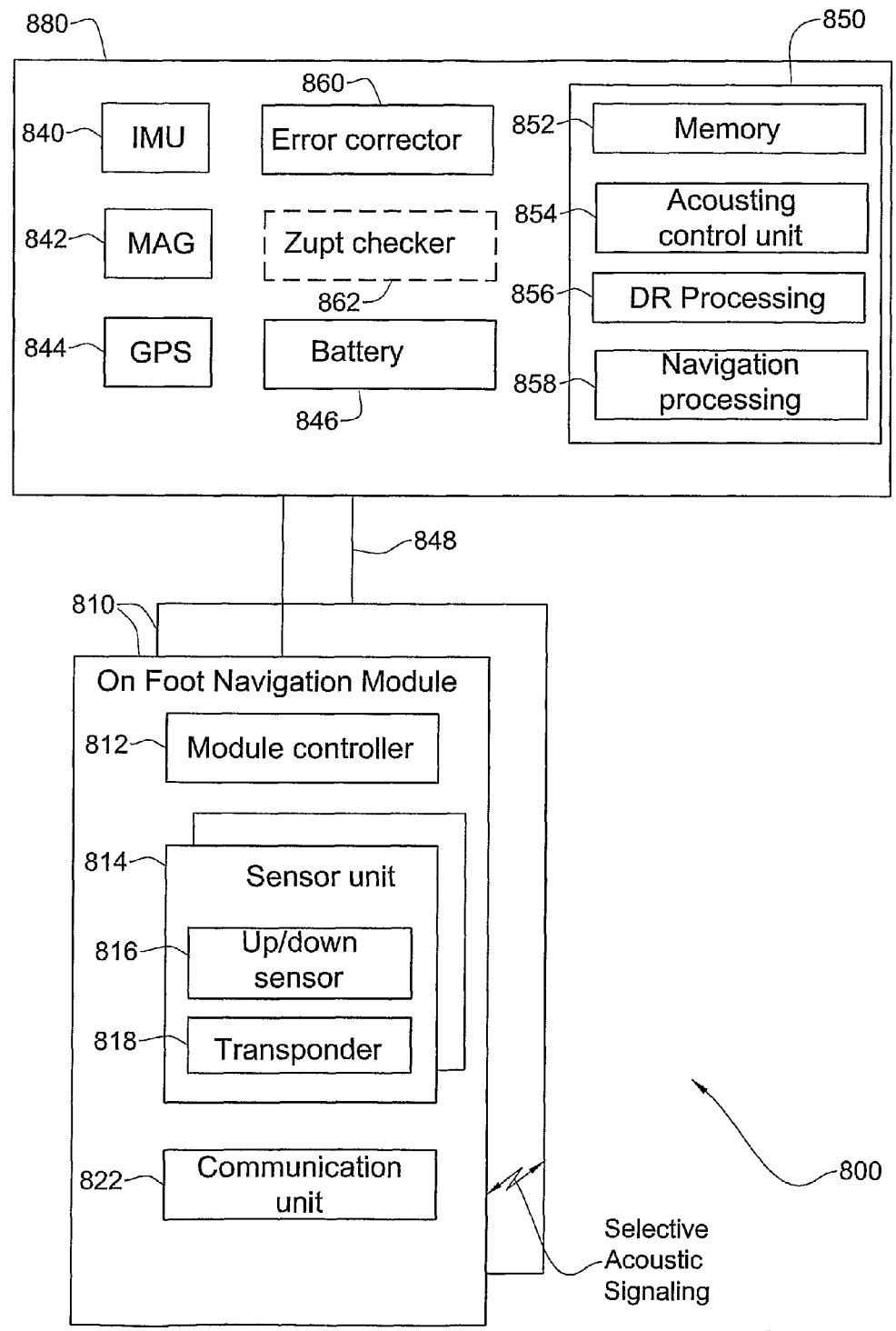
FIG. 8 is a block diagram of a navigation device according to another embodiment of the invention.

According to certain embodiments of the invention, the second processing unit is further adapted for receiving navigation inputs from various sources, and providing navigation solutions based on integration of these inputs. FIG. 8 is an illustration of a pedestrian navigation device 800 according to an embodiment of the invention, which comprises, inter-alia, two navigation modules 810 (e.g. similar to modules 710 discussed above with reference to FIG. 7 where the reference numerals 812, 814, 816, 818 and 822 correspond to reference numerals 712, 714, 716, 718 and 722 respectively); an Inertial Measuring Unit (IMU) 840 for providing inertial data; a magnetometer 842 for providing data useful for direction determination and correction; GPS unit 844 for providing GPS data useful for velocity and position determination and time synchronization and correction; a battery 846 and wire links 848 through which power is provided to the modules and communication is facilitated; and a processing unit 850 responsible for processing the data provided by the up/down sensors, affecting the acoustic operation of navigation modules 810 (e.g. as detailed above with reference to FIG. 7, processing unit 850 can include an acoustic control unit 854 for activating the generation of acoustic signal by a selected transducer), providing a dead-reckoning (DR) navigation solution and integrating IMU/MAG/GPS inputs with PDR inputs and providing an integrated navigation solution. In some cases, processing unit 850 can further comprise a memory 852. According to an embodiment of the invention not shown in FIG. 8, additional navigation sensors are added to the system and in such a case the navigation processing unit is further adapted to use the additional data in determining momentary positions of the pedestrian. The navigation system 800 further comprises an error corrector (error estimator) 860 which may be a hardware and/or software component integrated with or separated from the processing unit 850. As illustrated in FIG. 8 in a non-limiting manner, components 840-850 are housed by a housing 880 which can be a backpack, a belt-mounted unit, hand-held unit and more. According to an embodiment of the invention (not shown in FIG. 8), the navigation system further comprises a user interface module communicatively coupled to at least the navigation processing unit and having at least a display unit and a user input unit.

According to an embodiment of the invention (not shown in FIG. 8), at least one IMU 840 is placed in approximation to or integrated with at least one of the on-foot modules 810 (it should be understood that more than one IMU may be provided, e.g. at least one IMU per foot). According to an embodiment of the invention, each on-foot module comprises three sensor units—heel unit, toes unit and an ankle unit higher than the heel and toes unit. The IMU is integrated with the ankle unit. Thus, in accordance with this embodiment of the invention, the position of the IMU may be determined by determining the position of the ankle sensor unit. This provides additional IMU data which may be used for updating IMU errors.

Error Correction

According to an embodiment of the invention, the operation of the error corrector 860 is performed e.g. by known error correction techniques. According to another embodiment of the invention, the operation of the error corrector is extended as follows: information generated based on input provided by the navigation module/s 810 is used by the error corrector 860 for correcting navigation information generated based on IMU measurements. According to yet another embodiment of the invention, navigation module/s inputs are used for indicating zero-velocity situations (ZUPT). The DR-based velocity input may be used instead of or in addition to IMU-based zero-velocity inputs, thereby yielding better accuracy compared to ZUPT correction based on IMU inputs.

Also illustrated in FIG. 8 is a navigation device according to a third aspect of the present invention, which further includes a ZUPT checker 862. According to an embodiment of the invention, navigation processing is performed by the navigation processor 850 based on IMU inputs. ZUPT inputs are provided to the error corrector 860 from e.g. the navigation processor 858, based on IMU measurements, or alternatively, from the DR processing unit 856, based on DR measurements). A resultant correction input is fed to the navigation processor 858. Navigation module/s 810 inputs are used by the navigation processor for parallel navigation processing. When no zero-velocity updates are available (this is checked by the ZUPT checker 862), for example in a case of IMU malfunction, a DR navigation solution is provided as an alternative to the IMU solution.

Figure 9:
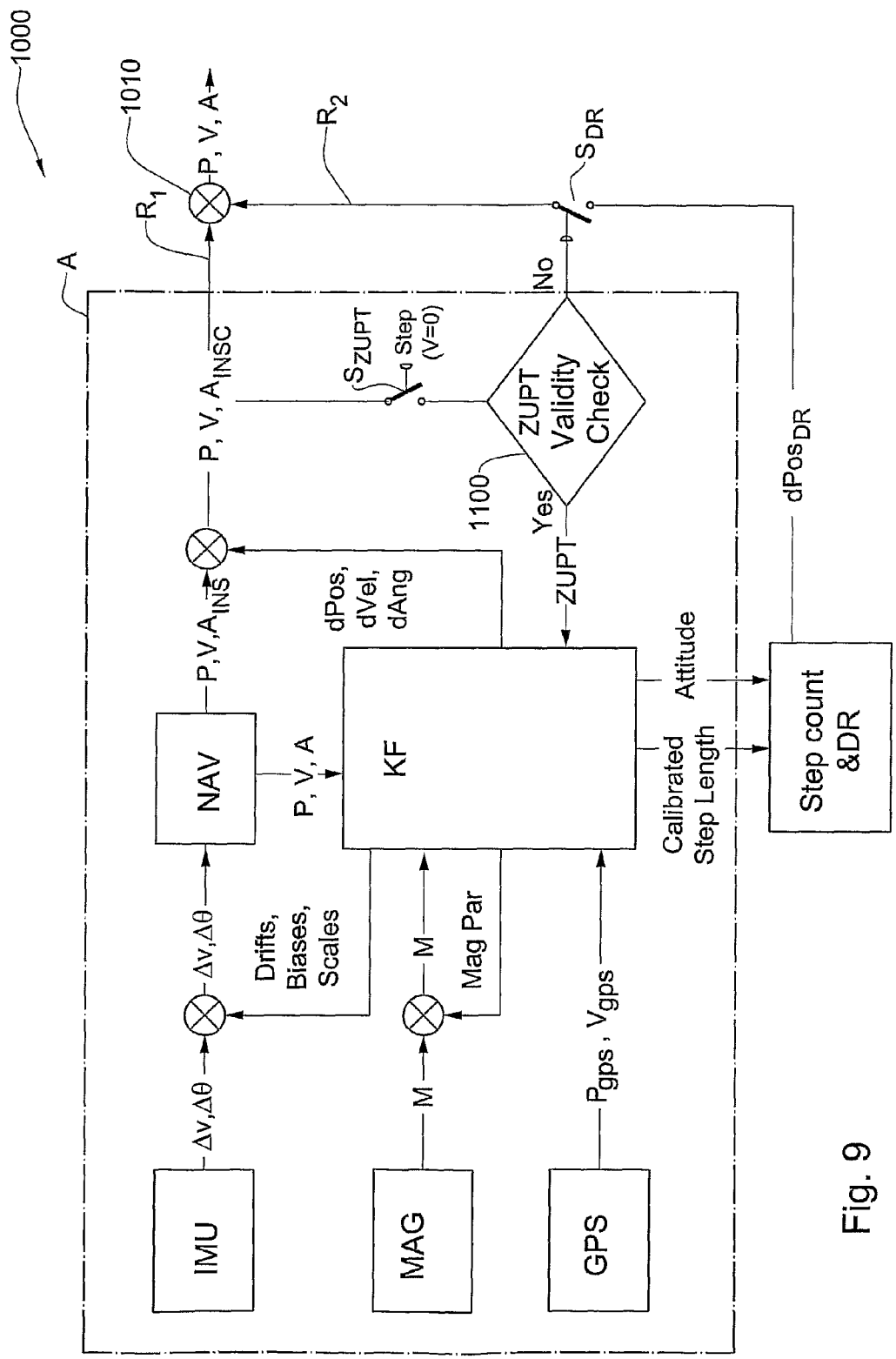
FIG. 9 is a representation of a software algorithm in accordance with an embodiment of the invention.

FIG. 9 is a representation of a software algorithm 1000 in accordance with an embodiment of the invention. In FIG. 9, the concept of an aspect of the present invention is illustrated as an improvement (extension) of an exemplary and non-limiting navigation algorithm. A certain integration cycle is illustrated. In accordance with the embodiment of the invention illustrated in FIG. 9, an additional step 1100 is added to the algorithm, in order to determine whether the IMU/MAG-based input is to be used in the current integration cycle or rather a Step Count & DR-based input. This will now be explained in greater detail.

In each integration cycle, a navigation solution P,V,A (Position, Velocity, and Attitude) is processed at operation 1010. Input for operation 1010 can be provided via route $R_1$, representing operations A marked by dashed box, the output of which is marked $P,V,A_{INSC}$; or route $R_2$ (marked dPos). Output $P,V,A_{INSC}$ is processed and calibrated based on input coming from inertial sensor IMU, magnetometer MAG and GPS unit, and ZUPT (zero-velocity updates) input. In case the velocity measured at the current instance is equal to zero (e.g. during a stationary stance phase of walking), zero-velocity updates are applied (e.g. according to known techniques) and output $P,V,A_{INS}$ is corrected by dPos, dVel and dAng coming from error estimator KF. If no zero-velocity updates are applied or if zero-velocity updates are erroneous, $P,V,A_{INS}$ will not be corrected and inertial drifts will not be extracted.

Thus, according to the embodiment of the invention illustrated in FIG. 9, dPos values used for position correction are available from e.g. the inertial solution (e.g. $P,V,A_{INSC}$, as illustrated in FIG. 9). According to another embodiment, dPos values are provided by the PDR unit. According to yet another embodiment, the pedestrian navigation unit further comprises a dedicated sensor for measuring pedestrian velocity. It should be understood that the invention is not limited by the source of velocity values.

Thus, according to an embodiment of the present invention, at operation 1100 a check is carried out, to determine if a ZUPT validly condition is met. According to another embodiment, the ZUPT validly condition requires that zero-velocity updates are available at every 0.5 second. According to yet another embodiment of the invention, ZUPT validly condition requires a certain correlation between velocity values processed based on e.g. IMU measurements and velocity values generated by other sensor e.g. DR unit. Other ZUPT validly conditions maybe used without departing from the scope of the present invention.

In case ZUPT is not properly performed (this is checked at step 1100, e.g.), a switch $S_{DR}$ is closed and position correction input $dPos_{DR}$ coming from SC&DR unit is available to the processing of navigation solution carried out at operation 1010.

It should be understood that the integrated navigation system and method discussed above with reference to FIGS. 8 and 9 are not limited to the use of DR data provided by DR systems and methods also provided by the present invention. Many other DR systems and methods can be used, with the required alterations and modifications, in order to correct navigation solutions in accordance with the novel manner presented herein.

A skilled person in the art will readily recognize that the concepts of the present invention and mainly the novel analysis of foot strikes on the ground, may be useful for a wide variety of applications including, but not limited to: other applications using TOA processing, applications using FOA (Frequency of arrival) processing, direction finding, step counting, acoustic pedometers, position calibration, velocity calibration, acceleration calibration, and many more.

What is claimed is:

1. A system useful for determining a momentary positions in a pedestrian navigation, said system comprising a sensor arrangement, said sensor arrangement comprising:
   a control unit, a first on-foot pedestrian navigation module and a second on-foot pedestrian navigation module;
   each of the modules including:
   a)—a module controller,
   b)—a communication unit for enabling said control unit to send and receive data to and from said module, and
   c) at least a first sensor unit and a second sensor unit;
   each sensor unit including:
   (i) an up/down sensor adapted for sensing a state condition being an 'up' condition or a 'down' condition, wherein said state conditions associated with relative displacement of the module with respect to a surface;
   (ii) a signal transmitter/receiver adapted for generating a propagating signal in response to an activation signal generated by said module controller;
   said control unit is adapted for continuously:
   1) receiving from said modules first data indicative of said state conditions;
   2) determining a pedestrian motion model out of plurality of motion models based on at least said first data;

3) based on the so determined pedestrian motion model, selectively sending control signals to either or both of the communication units in said modules thereby triggering generation of activation signals and in response triggering the transmitter/receivers in said modules to generate propagation signals;

4) receiving from communication unit of at least one of said modules second data associated with receipt of said propagating signal by at least two other of the signal transmitter/receivers; and 5) using said second data to determine a momentary position of one or more of the modules.

2. The system according to claim 1, wherein said signal transmitter/receiver is one from a group consisting of: an acoustic transducer, infrared transducer, Radio-Frequency transceiver; electro-magnetic wave transceiver.

3. The system according to claim 1, further comprising a battery or a power unit coupled to an external power source.

4. The system according to claim 1, wherein said up/down sensor is a pressure switch responsive to a pressure caused by the foot with respect to the surface.

5. The system according to claim 1, wherein said communication unit is a wire communication unit and/or a wireless communication unit.

6. The system according to claim 1, wherein said first sensor unit is located substantially beneath a heel area of the foot, and wherein said second sensor unit is located substantially beneath a toes area of the foot.

7. The system according to claim 1, wherein each of said modules comprises three sensor units or four sensor units.

8. The system according to claim 1, wherein said on-foot pedestrian navigation module is an add-on device adapted to be mounted onto the pedestrian's foot on-demand.

9. The system according to claim 1, wherein said on-foot pedestrian navigation module is integrated with a shoe.

10. The system according to claim 1, wherein said control unit is integrated with said on-foot pedestrian navigation module.

11. The system according to claim 1, wherein said control unit is an add-on device carried by the pedestrian or mounted on a part of the body.

12. The system according to claim 1, wherein said determined pedestrian motion model is based on modeling of at least one motion type by analyzing the state condition of at least three of the up/down sensors, at least one of the up/down sensors is not located on the same module as the others.

13. The system according to claim 12, wherein said at least three up/down sensors are selected from among a plurality of up/down sensors, said plurality of up/down sensors is one from a group consisting of:
for each module, a heel point located substantially near a heel area and a toes point, located substantially near a toe area, constituting a plurality of four points;
for each module, a heel point located substantially near a heel area, a toes point located substantially near a toe area, and a third point, constituting a plurality of six points;
for each module, a heel point located substantially beneath a heel area, a toes point located substantially beneath a toe area, a third point and a fourth point, constituting a plurality of eight points.

14. The system according to claim 12, wherein said motion type is one from a group consisting of: forward stepping; forward short-step walking; long step walking; backward stepping; sidestepping; footprint stepping; standing; running; turning; upstairs walking; downstairs walking; one foot and two feet upward jumping; forward stepping along a narrow path; and elevator and accelerator motion.

15. The system according to claim 1, further comprising a navigation processing unit coupled to or integrated with said control unit, said navigation processing unit being adapted for performing a time of arrival (TOA) processing and determining at least momentary positions of the pedestrian during motion.

16. The system according to claim 15, further comprising an Inertial Measuring Unit (IMU) for providing momentary inertial data and wherein said navigation processing unit is further adapted to use said momentary inertial data in processing a navigation solution relating to the pedestrian's motion.

17. The system according to claim 16, wherein: the inertial measuring unit is attached to at least one of said sensor units therefore enabling a continuous reduction of inertial drift errors of said IMU.

18. The system according to claim 1, wherein said signal transmitter/receiver is an acoustic transducer and said propogating signal is an acoustic signal, enabling TOA (Time of Arrival) processing which is useful in determining momentary positions of the pedestrian during motion.

19. The system according to claim 18, further comprising a navigation processing unit coupled to or integrated with the control unit, said navigation processing unit being adapted for performing said TOA processing and determining at least momentary positions of the pedestrian during motion.

20. The system according to claim 19, further comprising a user interface module communicatively coupled to at least the navigation processing unit and having at least a display unit and a user input unit.

21. The system according to claim 19, further comprising a GPS (Global Positioning System) unit for providing momentary GPS data, and wherein said navigation processing unit is further adapted to use said momentary GPS data in determining momentary positions of the pedestrian.

22. The system according to claim 19, further comprising an Inertial Measuring Unit (IMU) for providing momentary inertial data and wherein said navigation processing unit is further adapted to use said momentary inertial data in processing a navigation solution relating to the pedestrian's motion.

23. The system according to claim 22, wherein the inertial measuring unit is attached to at least one of said sensor units therefore enabling a continuous reduction of inertial drift errors of said IMU.

24. The system according to claim 22, further comprising a magnetometer.

25. The system according to claim 24, wherein said navigation solution includes at least one motion parameter from a group consisting of: position, velocity, acceleration, pitch, roll, and heading.

26. The system according to claim 22, further comprising an inertial error corrector coupled to at least said GPS unit and magnetometer, said inertial error corrector being further coupled to or integrated with said navigation processing unit, said inertial error corrector being adapted for:
receiving from the navigation processing unit a navigation signal indicative of momentary position, velocity and acceleration of the pedestrian;
receiving IMU data, GPS data and magnetometer data and in response generating a correction signal applied to said navigation signal and being indicative of a position correction, velocity correction and an acceleration correction, thereby constituting a corrected navigation solution.

27. The system according to claim 26, further comprising a ZUPT checker coupled to said error corrector, navigation processing unit and control unit, wherein said ZUPT checker is adapted for checking if a predetermined ZUPT validity condition is met and:
- if to the affirmative, continuing applying said correction signal to said navigation signal; and
- if to the alternative, applying a DR signal to said navigation signal until said ZUPT validity condition is met again,
- thereby reducing accumulation of inertial drift errors and increasing accuracy of said corrected navigation solution.

28. A method useful for pedestrian navigation, comprising:
- (a) associating at least three touch points with heel area and toes area of said pedestrian's left foot and right foot;
- (b) collecting up/down information about a relative displacement of each of said touch points with respect to a surface;
- (c) based on said up/down information and in accordance with a predetermined pedestrian motion model and a predetermined transmission/receiving scheme, generating a propagating wave at least at one of said touch points;
- (d) collecting information of receipt of said propagating wave at least by part of said touch points, this information including Time-of-Arrival information;
- thereby enabling TOA (Time of Arrival) processing which is useful in determining DR (Dead-Reckoning) momentary positions of the pedestrian during motion.

29. The method according to claim 28, wherein said predetermined transmission/receiving scheme is one of:
- transmitting said wave from one of said touch points located on a first foot and receiving said wave at least at two touch points located at a second foot; and
- transmitting said wave from two of said touch points located on a first foot and receiving said wave at least at one touch point located on a second foot.

30. The method according to claim 28, wherein said at least three touch points are selected from among a plurality of points, said plurality of points is one from a group consisting of:
- for each foot, a heel point representing displacement of a heel area and a toes point representing displacement of a toe area, constituting a plurality of four points;
- for each foot, a heel point representing displacement of a heel area and a toes point representing displacement of a toe area, and a third point, constituting a plurality of six points;
- for each foot, a heel point representing displacement of a heel area and a toes point representing displacement of a toe area, a third point and a fourth point, constituting a plurality of eight points.

31. The method according to claim 28, wherein said propagating wave is one of: an acoustic wave, infrared electro-magnetic wave, Radio Frequency electro-magnetic wave.

32. The method according to claim 28, wherein said collecting up/down information includes detecting a pressure caused by the foot with respect to the surface.

33. The method according to claim 28, wherein said DR momentary position is corrected by considering momentary GPS data.

34. The method according to claim 28, wherein said predetermined pedestrian motion model is based on modeling of at least one motion type by analyzing respective displacements with respect to the surface of said touch points.

35. The method according to claim 34, wherein said predetermined pedestrian motion model relates to at least one model type from a group consisting of: forward stepping; forward short-step walking; long step walking; backward stepping; sidestepping; footprint stepping; standing; running; turning; upstairs walking; downstairs walking; one foot and two feet upward jumping; forward stepping along a narrow path; elevated motion and accelerated motion.

36. The method according to claim 28, further comprising:
- (e) based on information regarding said generating and said receipt, performing TOA processing and determining momentary positions of the pedestrian during motion;
- (f) repeating said operations (a)-(e) as many times as required and determining a navigation solution relating to the pedestrian's motion.

37. The method according to claim 36, further comprising:
based on momentary inertial data, momentary GPS data, momentary magnetometer data and said momentary DR position data, determining a navigation solution.

38. The method according to claim 37, wherein said determining a navigation solution includes:
using IMU data, GPS data and magnetometer data for correcting said navigation solution, thereby constituting a corrected navigation solution.

39. The method according to claim 38, wherein correcting said navigation solution comprises:
- checking if a predetermined ZUPT validity condition is met and:
- if to the affirmative, continuing applying said correction signal to said navigation signal; and
- if to the alternative, applying a DR signal to said navigation signal until said ZUPT validity condition is met again,
- thereby reducing accumulation of inertial drift errors and increasing accuracy of said corrected navigation solution.

40. The method according to claim 38, wherein said navigation solution includes at least one motion parameter from a group consisting of: position, velocity, acceleration, pitch, roll, and heading.

* * * * *